(12) United States Patent
Bhat

(10) Patent No.: US 7,100,208 B2
(45) Date of Patent: Aug. 29, 2006

(54) METHOD AND APPARATUS FOR SOURCE-BASED MESSAGE AUTHORIZATION AND REJECTION

(75) Inventor: Vasudev Bhat, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 849 days.

(21) Appl. No.: 09/962,656

(22) Filed: Sep. 25, 2001

(65) Prior Publication Data

US 2003/0061508 A1   Mar. 27, 2003

(51) Int. Cl.
G06F 7/04 (2006.01)
G06F 17/30 (2006.01)
H04L 9/00 (2006.01)
G06F 15/16 (2006.01)

(52) U.S. Cl. .................. 726/30; 713/154; 709/206
(58) Field of Classification Search ........... 713/201, 713/170, 154; 709/230, 206; 726/30
See application file for complete search history.

(56) References Cited

U.S. PATENT DOCUMENTS

| | | | | |
|---|---|---|---|---|
| 5,359,729 A | * | 10/1994 | Yarnell et al. | 707/2 |
| 5,754,939 A | * | 5/1998 | Herz et al. | 455/3.04 |
| 5,835,087 A | * | 11/1998 | Herz et al. | 715/810 |
| 5,930,479 A | * | 7/1999 | Hall | 709/238 |
| 5,995,597 A | * | 11/1999 | Woltz et al. | 379/93.24 |
| 6,077,085 A | * | 6/2000 | Parry et al. | 434/322 |
| 6,321,267 B1 | * | 11/2001 | Donaldson | 709/229 |
| 6,421,709 B1 | * | 7/2002 | McCormick et al. | 709/206 |
| 6,691,156 B1 | * | 2/2004 | Drummond et al. | 709/206 |
| 6,701,440 B1 | * | 3/2004 | Kim et al. | 713/201 |
| 6,732,149 B1 | * | 5/2004 | Kephart | 709/206 |
| 6,842,773 B1 | * | 1/2005 | Ralston et al. | 709/206 |
| 2004/0059731 A1 | * | 3/2004 | Yianilos et al. | 707/5 |

OTHER PUBLICATIONS

MailMsg.com. "Bounced Email Messages", <http://www.mailmsg.com/bounce.htm>.*
AOL. "AOL Instant Messenger—User's Guide", Jul. 2001, <http://web.archive.org/web/20010703111800/http://www.aim.aol.com/beta/uguide/index.html>.*

* cited by examiner

*Primary Examiner*—Jacques H. Louis-Jacques
*Assistant Examiner*—Michael J. Simitoski

(57) ABSTRACT

Unwanted electronic messages can be avoided by screening them before they enter a receiving client. Only messages from authorized sending parties are passed to the receiving client while messages from sending parties not previously authorized are discarded or returned. The same arrangement can be used with cellular and conventional telephones, facsimile machines, and other devices.

6 Claims, 4 Drawing Sheets

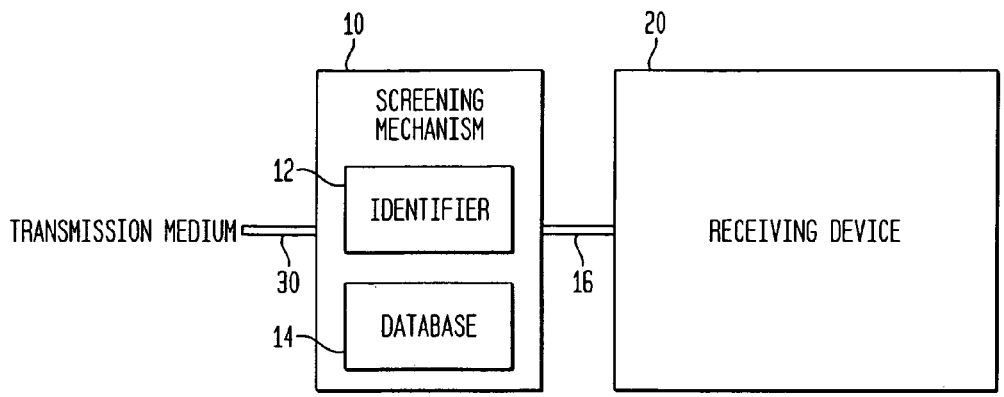
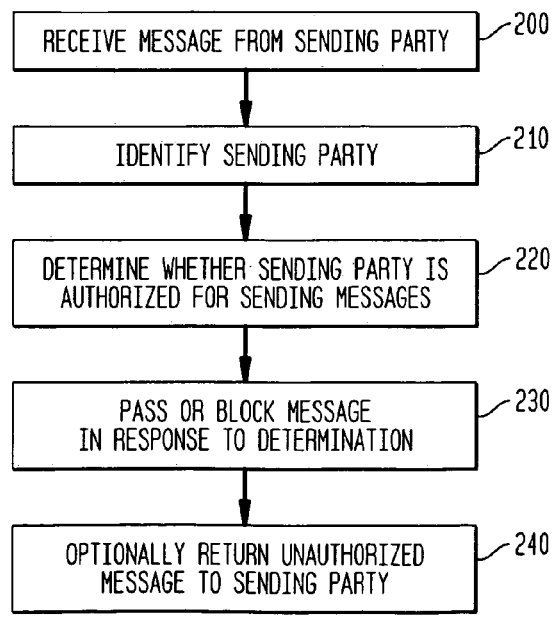

METHOD AND APPARATUS FOR SOURCE-BASED MESSAGE AUTHORIZATION AND REJECTION

BACKGROUND OF THE INVENTION

Currently-available e-mail systems used with the Internet accept any message directed to the recipient's address. An exception to receipt of such messages is a blocking device that will selectively block a specific address or series of addresses, perhaps identified by a particular domain name. To utilize this type of blocking, one must identify the unwanted sender and enter its identify in a database. However, this still permits the receipt of other, heretofore unidentified, but unauthorized messages. A scheme that would prevent the receipt of such messages without having to first identify them would be highly desirable.

BRIEF DESCRIPTION OF THE DRAWINGS

FIG. 1 is a block diagram of a system providing authorization of messages;

FIG. 2 is a flow chart for the system of FIG. 1;

SUMMARY OF THE INVENTION

Figure 3:
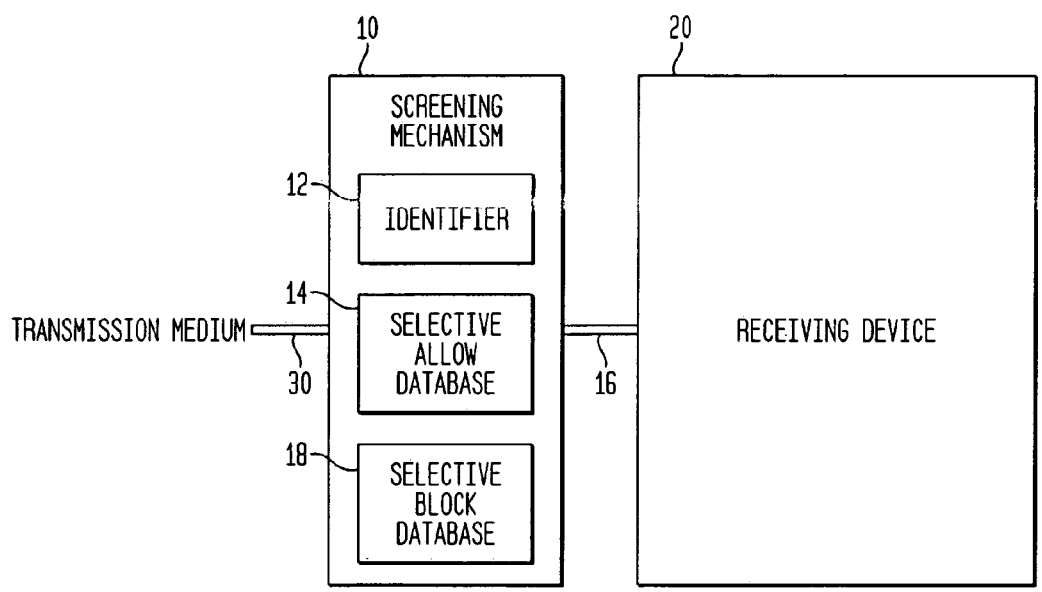
FIG. 3 is a block diagram of a system that alternately provides authorization and blocking of messages.

In a preferred embodiment of the invention, a method is provided for blocking unwanted messages from a receiving device, the method comprising the steps of receiving a message from a sending party; identifying the sending party; determining whether the sending party is an authorized originator; and passing the message to the receiving device if the determining step reveals that the sending party is an authorized originator.

According to another embodiment of the invention, a method is provided for blocking unwanted messages from a receiving device, the method comprising the steps of selecting one of an authorized originator list or a blocked originator list; receiving a message from a sending party; identifying the sending party; determining, in response to the step of selecting a list, one of whether the sending party is on the authorized originator list or whether the sending party is on the blocked originator list; and passing the message to the receiving device if the authorized originator list is selected and the sending party is on the authorized originator list or if the blocked originator list is selected and the sending party is not on the blocked originator list.

In particular variations of these embodiments, the step of determining whether the sending party is an authorized originator further comprises determining whether an address of the sending party has been approved for receipt of messages and the step of determining whether the address of the sending party has been approved for receipt of messages further comprises determining whether an e-mail address or a telephone number is present in a database of approved senders. In addition the step of determining whether the e-mail address or the telephone number is present in the database further comprises determining whether a domain for the email address or telephone number is present in the database of approved senders and the step of determining whether the sending party is an authorized originator further comprises determining whether a domain of the sending party is present in a database of approved senders. Further, the method may further comprise discarding the message, returning the message to the sending party or determining whether a size of the message is authorized.

In a particularly preferred embodiment of the invention, a computer-based system is provided that has a processor and associated memory for blocking unwanted messages from a receiving device, comprising an input device for receiving a message from a sending party; an identifier for identifying the sending party; and a screening mechanism having a database of approved senders, the processor determining whether the sending party is an authorized originator by comparing the identifier with the approved senders and passing the message to the receiving device when the sending party is an authorized originator.

In another embodiment, a computer-based system is provided having a processor and associated memory for blocking unwanted messages from a receiving device, comprising an input device for receiving a message from a sending party; identifier for identifying the sending party; and a screening mechanism having a database of approved senders and a database of blocked senders, the processor determining which database to use at any particular time, the processor passing the message to the receiving device if the sending party is an authorized originator, the processor determining an authorized originator by either finding the identifier within the database of approved senders or not finding the identifier with the database of blocked senders.

In particular variations of these embodiments, the database further comprises a list of approved e-mail addresses or approved telephone numbers for the approved senders or the database further comprises a list of approved domains for the approved senders. In addition, the processor may discards the message or returns the message to the sender when the processor determines that the message is not from an authorized sender and said screening mechanism further comprises acceptable message size data, the processor and passing the message to the receiving device when the message is consistent with the acceptable message size data.

In yet another preferred embodiment of the invention a receiving device is provided comprising an input device for receiving a message from a sending party; an identifier for identifying the sending party; and a screening mechanism for determining whether the sending party is an authorized originator, and accepting the message or alternatively blocking the message.

In variations of this embodiment, the screening mechanism comprises a database containing approved addresses or the database contains authorized email addresses or a telephone numbers. Further, the screening mechanism comprises a database containing approved e-mail address domains. In addition, a software mechanism is provided for discarding or returning the message or the apparatus further comprises a software routine for determining whether the size of the message is authorized.

In yet another embodiment of the invention, a receiving device, is provided comprising an input device for receiving a message from a sending party; identifier for identifying the sending party; and a screening mechanism for determining whether the sending party is an authorized originator or alternatively determining whether the sending party is an unauthorized originator, and accepting the message or alternatively blocking the message.

In still another embodiment of the invention an apparatus is provided for blocking unwanted messages from a receiving device, comprising an input device for receiving a message from a sending party; means for identifying the sending party; means for determining whether the sending party is an authorized originator; and means, responsive to the means for determining, for passing the message to the receiving device or alternatively blocking the message. In variations of this embodiment, the means for determining whether the sending party is an authorized originator comprises means for determining whether the address of the sending party has been approved, or the means for determining whether the address of the sending party has been approved for receipt of messages comprises means for determining whether an e-mail address or a telephone number is authorized, or the means for determining whether the sending party is an authorized originator comprises means for determining whether the domain of the address of the sending party has been approved. In still other variations, the receiver further comprises means for discarding or returning the message or means for determining whether the size of the message is authorized.

DESCRIPTION OF THE INVENTION

A computer-based system is disclosed, having a memory and a processor, that blocks all unauthorized messages by utilizing a screening mechanism. The screening mechanism may set up by either a user of the system or by a computer or other automated system that provides the addresses from which authorized messages are to be received. All incoming messages would be examined by the screening mechanism before being passed onto the receiving device. In one arrangement, the sending party from which messages are to be received would have to be entered into the screening mechanism cleared before the message screening takes place. In a variation of this, the entry of a general location of origin, e.g., a domain name, would suffice for clearance of all messages originating from that domain. This system may used in a corporate setting, where messages originating from all senders having a common domain name would be automatically accepted. In yet another variation, other screening characteristics besides origination address, for example the size or content of a message, may be blocked by the screening mechanism. This last function can be achieved with a software routine or script that operates as part of or in conjunction with the screening mechanism. In a further variation, the screening mechanism may have the capability to alternately selectively allow or selectively block messages.

While one application of this system is for e-mail messages received over the Internet, such a scheme may also be used with cellular telephones, conventional telephones, facsimile machines, and any other device normally open to receiving messages.

As illustrated in FIG. 1, an input device such as a screening mechanism 10 connected to a transmission medium 30 precedes the receiving device 20 via interconnection 16. The screening mechanism 10 has an identifier 12 that determines the identity of the sending party and then determines whether the identity of the sending party is authorized. Alternatively, the identifier 12 could be external to the screening mechanism 10. The receiving device 20 may itself contain an identifier, in which case the receiving device identifier itself would be provided to the screening mechanism 10.

In a particularly preferred embodiment, a look-up table or database 14 containing the identities of authorized parties is used to maintain the message receipt authorizations. As noted above, authorization may be extended to parties from specific addresses, all sending parties from a common domain name, all sending parties having a common identifier in the address, or according to some other aspect of the of the received messages.

If the sending party is unauthorized, the message may be blocked or discarded. In the case of a blocked message, the message may be returned to the sender with a response message indicating that prior authorization is required for transmission to be received.

The procedure for utilizing the apparatus of FIG. 1, as just described, is shown in the flowchart of FIG. 2 (steps 200 through 240). In a particularly preferred embodiment, the method of the invention includes the steps of receiving the message 200, identifying the sender 210, determining the authorization 220, and disposing of the message (i.e., pass or block) 230. Optionally, the message may be returned to an unauthorized sender 240. A software routine within the screening mechanism or the receiving device may be utilized to achieve this returned message function.

The use of the system provided in FIG. 1 should not result in significant message processing delays as compared to existing systems that selectively block unwanted parties. In fact, the delays in the screening process, whether a selective block, screening mechanism or a selective allow, screening mechanism is used, depends solely on the number of addresses or criteria within the screening mechanism to which each message must be compared. By way of example, assume that 100 messages originating from 50 different sending entities are received by the screening mechanism of the present invention. Further assume that messages from 25 of the senders are to be accepted, and messages from the other 25 are to be rejected. Since a selective block, screening mechanism and a selective allow, screening mechanism both must use a screening mechanism containing 25 entries, the processing times of both systems for the same 100 received messages are identical, presuming that each screen takes an equivalent amount of time to process.

If, however, the number of addresses to selectively block changes in proportion to the total number of sending addresses, say increases from 25 to 35, then the processing time needed to filter the same 100 messages will increase for a system using selective block, filtering mechanism vis-à-vis a system according to the present invention using a selective allow, filtering mechanism. This is solely due the fact that the selective blocking filter would contain 35 addresses through which each message must be filtered as compared to the selective allow filter which would contain 15 addresses. Finally, it should be realized that the selection of the filter also determines the default status of the message with respect to addresses that are not included in either database, i.e. with the selective block screening mechanism, received messages from addresses that are not identified by the selective block screening mechanism are allowed to pass to the receiving device, whereas with the selective allow screening mechanism received messages with addresses that are not identified by the selective allow, screening mechanism are prevented from passing to the receiving device.

In another embodiment of the present invention, the screening mechanism 10 may be configured to selectively work in either one of the two modes, blocking or allowing. As described above, when the list of unauthorized originators begins to exceed the number of authorized parties in a system that uses a blocking, filtering mechanism, the system begins to slow down. Arguably, it would be faster at this point to employ a selective allow filtering mechanism to permit the passages of messages from authorized parties. Thus, at the user's option, or as automatically selected by the systems, the screening mechanism 10 can switch from the mode of blocking only messages of unauthorized parties ("selective block") to allowing only messages of authorized parties ("selective allow"). As shown in FIG. 3, the screening mechanism 10 of this embodiment has two databases 14 and 18. One database (selective allow) would hold the addresses of authorized originators while the other (selective block) would contain addresses of unauthorized parties. In this alternative embodiment, the system would be directed to switch between the filters depending on the user's selection or the or possibly some efficiency optimization routine implemented automatically by the system itself. With automatic system optimization, some type of message analysis would be performed by the system to determine appropriate switching points based on the filtering routines and criteria selected for filtering. Of course, in this embodiment, the receiver and system must update and maintain both a list of "blocked" and an "allowed" sending addresses (or other criteria).

Figure 4:
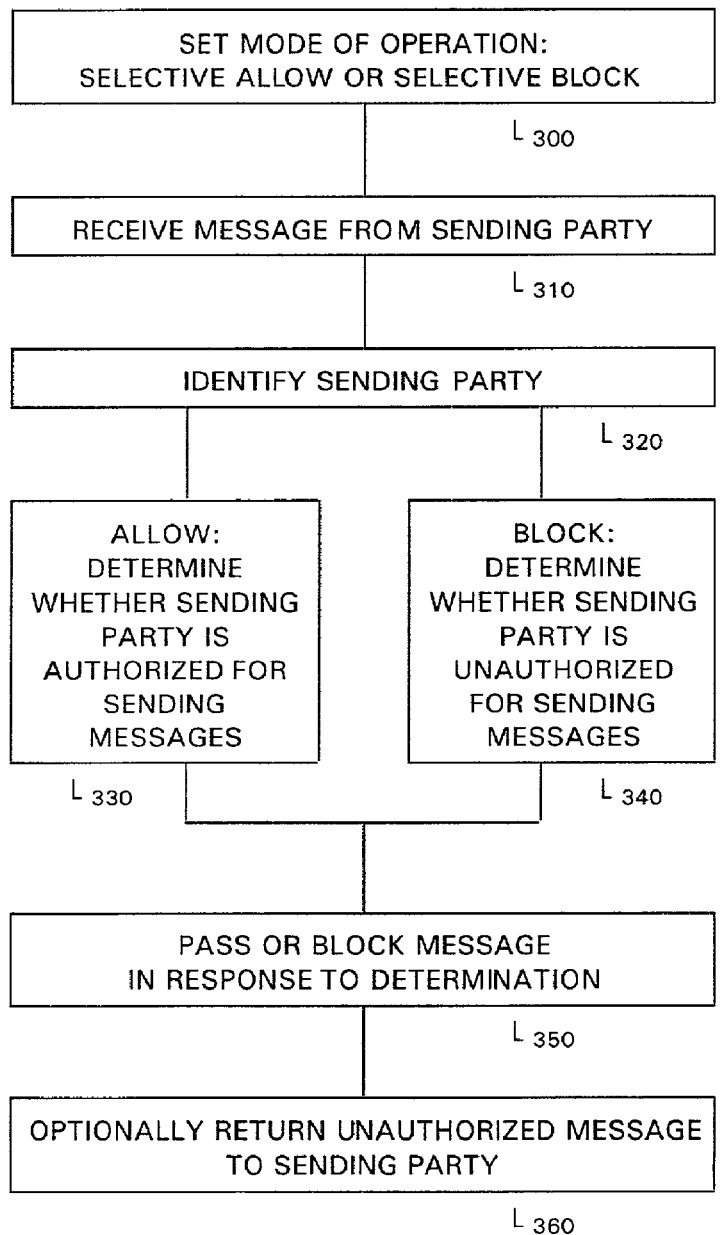
FIG. 4 is a flow chart for the system of FIG. 3.

The procedure for utilizing the apparatus of FIG. 3, as just described, is s shown in the flowchart of FIG. 4 (steps 300 through 360) including the steps of selecting a mode 300, receiving a message 310, identifying a sender 320, determining an authorization 330 or 340, and, depending on the mode selected, disposing of the message (i.e., pass or block) 350. Optionally, the message may be returned to an unauthorized sender 360. As mentioned above, this function may be achieved, possibly in software, in any one of a plurality of fashions.

Figure 5:
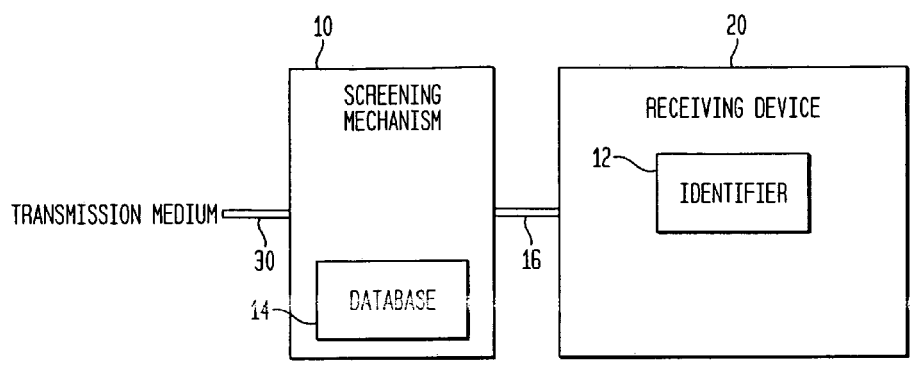
FIGS. 5 and 6 are alternative configurations of the system of FIG. 1.
Figure 6:
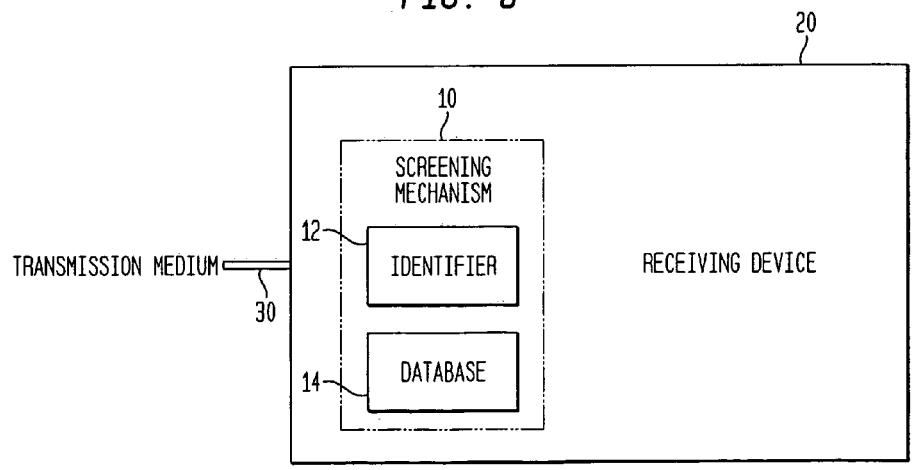

In FIG. 1, the screening mechanism 10 is separate from the receiving device 20. Other configurations, such as shown in FIGS. 5 and 6 are also possible. The arrangement of FIG. 3 utilizes an identifier 12 resident in the receiving device 20 and passes back the identification to the screening mechanism 10 which then performs a check against the database 14. Alternatively, the entire screening mechanism 10 could be realized in a hardware module, firmware, software, or some other means within the receiving device 20 as shown in FIG. 6. Other configurations, beyond those of FIGS. 1, 3, 5, and 6 are possible.

The receiving device 20 can be an e-mail client, a cellular telephone, a conventional telephone, a facsimile machine, or any other device normally connected to a transmission medium.

While particular embodiments and applications of the invention have been shown and described, it will be obvious to those skilled in the art that the specific terms and figures are employed in a generic and descriptive sense only and not for the purposes of limiting or reducing the scope of the broader inventive aspects herein. By disclosing the preferred embodiments of the present invention above, it is not intended to limit or reduce the scope of coverage for the general applicability of the present invention. Persons of skill in the art will easily recognize the substitution of similar components and steps in the apparatus and methods of the present invention.

What is claimed is:

1. A method for preventing unwanted messages from reaching a receiving device, comprising:
   compiling databases comprising entries of authorized and unauthorized originators of messages;
   receiving a message from a sending party;
   identifying the sending party; and
   selecting an exclusive mode of operation corresponding to the database with the least number of entries, where the modes of operation comprise an allowing mode for authorized originators and a blocking mode for unauthorized originators, or where the databases are of equal size, defaulting to a predetermined mode, where
      in the allowing mode, determining by reference to the database of authorized originators whether the sending party is an authorized originator and, in response, passing the message of an authorized originator to the receiving device or, if the sending party is not an authorized originator, blocking the message; or
      in the blocking mode, determining by reference to the database of unauthorized originators whether the sending party is an unauthorized originator and, in response, blocking the message of an unauthorized originator or, if the sending party is not an unauthorized originator, passing the message to the receiving device.

2. A method as set forth in claim 1, where, in either the allowing mode or blocking mode, the step of blocking further comprises selectively discarding or returning the message to the sending party.

3. A method as set forth in claim 1, where, in either the allowing mode or blocking mode, the step of blocking further comprises returning the message to the sending party.

4. An apparatus for preventing unwanted messages from reaching a receiving device, comprising:
   databases comprising entries of authorized and unauthorized originators of messages;
   means for receiving a message from a sending party;
   means for identifying the sending party; and
   a screening mechanism, responsive to the means for comparing, comprising means for selecting an exclusive mode of operation corresponding to the database with the least number of entries, where the modes of operation comprise an allowing mode for authorized originators and a blocking mode for unauthorized originators, or where the databases are of equal size, defaulting to a predetermined mode, where
      in the allowing mode, means for determining by reference to the database of authorized originators whether the sending party is an authorized originator and, means, responsive to the means for determining by reference to the database of authorized originators, for passing the message of an authorized originator to the receiving device or, if the sending party is not an authorized originator, blocking the message; or
      in the blocking mode, means for determining by reference to the database of unauthorized originators whether the sending party is an unauthorized originator and, means, responsive to the means for determining by reference to the database of unauthorized originators, for blocking the message of an unauthorized originator or, if the sending party is not an unauthorized originator, passing the message to the receiving device.

5. An apparatus as set forth in claim 4, where
   in the allowing mode, the means responsive to the means for determining further comprises means for selectively discarding or returning the message to the sending party; and
   in the blocking mode, the means responsive to the means for determining further comprises means for selectively discarding or returning the message to the sending party.

6. An apparatus as set forth in claim 4, where
   in the allowing mode, the means responsive to the means for determining further comprises means for selectively returning the message to the sending party; and
   in the blocking mode, the means responsive to the means for determining further comprises means for selectively returning the message to the sending party.

* * * * *